United States Patent
Jeong et al.

(10) Patent No.: US 10,700,352 B2
(45) Date of Patent: Jun. 30, 2020

(54) PRECURSOR OF POSITIVE ELECTRODE ACTIVE MATERIAL FOR SECONDARY BATTERY AND POSITIVE ELECTRODE ACTIVE MATERIAL PREPARED USING THE SAME

(71) Applicant: LG Chem, Ltd., Seoul (KR)

(72) Inventors: Myung Gi Jeong, Daejeon (KR); Sang Won Woo, Daejeon (KR); Seung Beom Cho, Daejeon (KR); Sang Soon Choi, Daejeon (KR)

(73) Assignee: LG Chem, Ltd. (KR)

( * ) Notice: Subject to any disclaimer, the term of this patent is extended or adjusted under 35 U.S.C. 154(b) by 117 days.

(21) Appl. No.: 16/070,049

(22) PCT Filed: Mar. 3, 2017

(86) PCT No.: PCT/KR2017/002340
§ 371 (c)(1),
(2) Date: Jul. 13, 2018

(87) PCT Pub. No.: WO2017/150945
PCT Pub. Date: Sep. 8, 2017

(65) Prior Publication Data
US 2019/0020022 A1    Jan. 17, 2019

(30) Foreign Application Priority Data
Mar. 4, 2016    (KR) .................. 10-2016-0026225

(51) Int. Cl.
*H01M 4/505*    (2010.01)
*H01M 4/525*    (2010.01)
(Continued)

(52) U.S. Cl.
CPC .......... *H01M 4/505* (2013.01); *C01G 53/006* (2013.01); *C01G 53/50* (2013.01); *H01M 4/131* (2013.01);
(Continued)

(58) Field of Classification Search
CPC ............................. H01M 4/131; H01M 4/505
(Continued)

(56) References Cited

U.S. PATENT DOCUMENTS

2004/0200998 A1    10/2004    Park et al.
2009/0029253 A1    1/2009    Itou et al.
(Continued)

FOREIGN PATENT DOCUMENTS

CN    103765638 A    4/2014
CN    104521039 A    4/2015
(Continued)

OTHER PUBLICATIONS

Extended European Search Report including Written Opinion dated Feb. 6, 2019 for Application No. EP 17760349.5.
(Continued)

*Primary Examiner* — James M Erwin
(74) *Attorney, Agent, or Firm* — Lerner, David, Littenberg, Krumholz & Mentlik, LLP

(57) ABSTRACT

The present disclosure relates to a precursor of a positive electrode active material for a secondary battery including a single layer-structured secondary particle in which pillar-shaped primary particles radially oriented in a surface direction from the particle center are aggregated, wherein the secondary particle has a shell shape, and the primary particle includes a composite metal hydroxide of Ni—Co—Mn of the following Chemical Formula 1, and a positive electrode active material prepared using the same:

$Ni_{1-(x+y+z)}Co_xM_yMn_z(OH)_2$    [Chemical Formula 1]

(Continued)

In Chemical Formula 1, M, x, y and z have the same definitions as in the specification.

11 Claims, 2 Drawing Sheets

(51) Int. Cl.
*H01M 10/0525* (2010.01)
*H01M 4/131* (2010.01)
*C01G 53/00* (2006.01)
*H01M 4/02* (2006.01)

(52) U.S. Cl.
CPC ....... *H01M 4/525* (2013.01); *H01M 10/0525* (2013.01); *C01P 2002/52* (2013.01); *C01P 2004/03* (2013.01); *C01P 2004/45* (2013.01); *C01P 2004/51* (2013.01); *C01P 2004/52* (2013.01); *C01P 2004/54* (2013.01); *C01P 2004/61* (2013.01); *C01P 2006/11* (2013.01); *C01P 2006/12* (2013.01); *H01M 2004/021* (2013.01); *H01M 2004/028* (2013.01)

(58) Field of Classification Search
USPC ........................................................ 429/223
See application file for complete search history.

(56) References Cited

U.S. PATENT DOCUMENTS

| | | |
|---|---|---|
| 2013/0078520 A1 | 3/2013 | Toya et al. |
| 2013/0209888 A1 | 8/2013 | Nagai |
| 2014/0158932 A1 | 6/2014 | Sun et al. |
| 2014/0205901 A1 | 7/2014 | Nagai et al. |
| 2015/0072232 A1 | 3/2015 | Nagai |
| 2015/0236378 A1* | 8/2015 | Kuwajima ........ H01M 10/0567 429/200 |
| 2016/0013471 A1 | 1/2016 | Kaseda et al. |
| 2016/0049647 A1 | 2/2016 | Park et al. |
| 2016/0156033 A1 | 6/2016 | Fujii et al. |
| 2016/0181597 A1 | 6/2016 | Kim et al. |
| 2016/0190573 A1 | 6/2016 | Sun et al. |
| 2017/0338488 A1 | 11/2017 | Sun et al. |
| 2018/0013129 A1 | 1/2018 | Lee et al. |

FOREIGN PATENT DOCUMENTS

| | | |
|---|---|---|
| JP | H10029820 A | 2/1998 |
| JP | 2002304992 A | 10/2002 |
| JP | 2012254889 A | 12/2012 |
| JP | 2013051172 A | 3/2013 |
| JP | 2013229339 A | 11/2013 |
| JP | 2014049410 A | 3/2014 |
| JP | 2016004703 A | 1/2016 |
| KR | 20030083476 A | 10/2003 |
| KR | 20060130964 A | 12/2006 |
| KR | 20130138147 A | 12/2013 |
| KR | 20150016125 A | 2/2015 |
| KR | 20150025047 A | 3/2015 |
| KR | 20150134259 A | 12/2015 |
| WO | 2006118279 A1 | 11/2006 |
| WO | 2012049779 A1 | 4/2012 |
| WO | 2013145290 A1 | 10/2013 |
| WO | 2014061579 A1 | 4/2014 |
| WO | 2014061580 A1 | 4/2014 |
| WO | 2014133063 A1 | 9/2014 |
| WO | 2015008863 A1 | 1/2015 |
| WO | 2015016647 A1 | 2/2015 |
| WO | 2016021791 A1 | 2/2016 |

OTHER PUBLICATIONS

Jang-Yeon Hwang et al: "Radially aligned hierarchical columnar structure as a cathode material for high energy density sodium-ion batteries" Nature Communications, vol. 6, No. 1, Apr. 17, 2015 (Apr. 17, 2015), XP055446508, p. 1-9.
International Search Report for PCT/KR2017/002340 dated Jun. 8, 2017.

* cited by examiner

PRECURSOR OF POSITIVE ELECTRODE ACTIVE MATERIAL FOR SECONDARY BATTERY AND POSITIVE ELECTRODE ACTIVE MATERIAL PREPARED USING THE SAME

CROSS-REFERENCE TO RELATED APPLICATIONS

The present application is a national phase entry under 35 U.S.C. § 371 of International Application No. PCT/KR2017/002340, filed on Mar. 3, 2017, which claims the benefit of Korean Patent Application No. 10-2016-0026225, filed on Mar. 4, 2016, the disclosures of which is incorporated herein by reference.

TECHNICAL FIELD

The present disclosure relates to a precursor of a positive electrode active material for a secondary battery capable of enhancing an initial capacity property, an output property and a long-term cycle life property when used in a battery by increasing lithium ion mobility in the active material and active material structural stability when preparing the active material, and a positive electrode active material prepared using the same.

DESCRIPTION OF THE RELATED ART

With increases in technology developments and demands for mobile devices, demands for secondary batteries as an energy source have rapidly increased. Among such secondary batteries, lithium secondary batteries having high energy density and voltage, a long cycle life and a low self-discharge rate have been commercialized and widely used.

However, lithium secondary batteries have a problem in that a cycle life rapidly decreases as charge and discharge are repeated. Particularly, such a problem is more serious at high temperatures. This is due to phenomena occurring from electrolyte decomposition or active material degeneration caused by moisture or other difference influences inside the battery, or an increase in the internal resistance of the battery.

Accordingly, positive electrode active materials for a lithium secondary battery currently having been actively researched and developed, and used are layer-structured $LiCo_2O_2$. $LiCoO_2$ is most widely used due to excellent cycle life property and charge and discharge efficiency, but has low structural stability, and therefore, has a limit to be used in technologies of manufacturing higher capacity batteries.

As positive electrode active materials for replacing $LiCoO_2$, various lithium transition metal oxides such as $LiNiO_2$, $LiMnO_2$, $LiMn_2O_4$, $LiFePO_4$ and $Li(Ni_xCo_yMn_z)O_2$ have been developed. Among these, $LiNiO_2$ has an advantage of exhibiting a battery property of high discharge capacity, but has problems in that it is difficult to be synthesized using a simple solid-state reaction, and it has low thermal stability and cycle life property. In addition, lithium manganese-based oxides such as $LiMnO_2$ or $LiMn_2O_4$ have advantages of excellent thermal safety and low costs, but have problems in that capacity is small and high temperature properties are low. Particularly, $LiMn_2O_4$ has been partly commercialized as a low-priced product, but does not have a favorable cycle life property due to low Jahn-Teller distortion caused by $Mn^{3+}$. In addition, although extensive studies have been currently conducted on $LiFePO_4$ for applications in hybrid electric vehicles (HEV) due to its low costs and excellent safety, applications in other fields have been difficult due to low conductivity.

In view of the above, a material receiving highest attention as a substitute positive electrode active material of $LiCoO_2$ is a lithium nickel manganese cobalt oxide including lithium in excess, that is, $Li_a(Ni_xCo_yMn_z)_{2-a}O_2$ (herein, a, x, y and z are each independently an atomic fraction of oxide-forming elements, and $1<a\le1.5$, $0<x\le1$, $0<y\le1$, $0<z\le1$, $0<x+y+z\le1$). This material has advantages of being lower-priced than $LiCoO_2$, and used under high capacity and high voltage, but has disadvantages of having unfavorable rate capability and life cycle property at high temperatures.

Accordingly, methods for preparing a positive electrode active material capable of enhancing lithium secondary battery performance through changing compositions in a lithium transition metal oxide or controlling the crystal structure have been urgently required.

DISCLOSURE OF THE INVENTION

Technical Problem

The present disclosure is directed to providing a precursor of a positive electrode active material for a secondary battery capable of enhancing an initial capacity property, an output property and a long-term cycle life property when used in a battery by increasing lithium ion mobility in the active material and active material structural stability when preparing the active material, and a method for preparing the same.

The present disclosure is also directed to providing a positive electrode active material for a secondary battery prepared using the precursor, and therefore, capable of reducing resistance, and enhancing output and cycle life properties when used in a battery since lithium intercalation and deintercalation readily occurs, and surface resistance and crack occurrences during charge and discharge are minimized.

The present disclosure is also directed to providing a positive electrode for a secondary battery, a lithium secondary battery, a battery module and a battery pack including the positive electrode active material.

Technical Solution

In view of the above, one embodiment of the present disclosure provides a precursor of a positive electrode active material for a secondary battery including a single layer-structured secondary particle in which pillar-shaped primary particles radially oriented in a surface direction from the particle center are aggregated, wherein the secondary particle has a shell shape, and the primary particle includes a composite metal hydroxide of Ni—Co—Mn of the following Chemical Formula 1:

$$Ni_{1-(x+y+z)}Co_xM_yMn_z(OH)_2 \qquad \text{[Chemical Formula 1]}$$

In Chemical Formula 1, M includes any one, or two or more elements selected from the group consisting of Al, Zr, Mg, Zn, Y, Fe and Ti, and x, y and z are each $0<x<1$, $0\le y<1$, $0<z<1$ and $0<x+y+z<1$.

Another embodiment of the present disclosure provides a method for producing the precursor of a positive electrode active material for a secondary battery, the method including preparing a metal-containing solution by mixing a nickel raw material, a cobalt raw material and a manganese raw material; and introducing an ammonium cation-containing complex forming agent and a basic compound to the metal-containing solution and co-precipitation reacting the result under a pH of 10.50 to 12.00 and a temperature of 50° C. to 70° C., wherein the ammonium cation-containing complex forming agent is introduced at a rate of 0.5 times to 1.5 times with respect to an introduction rate of the metal-containing solution.

Still another embodiment of the present disclosure provides a positive electrode active material for a secondary battery including a single layer-structured secondary particle in which pillar-shaped primary particles radially oriented in a surface direction from the particle center are aggregated, wherein the secondary particle has a shell shape, and the primary particle includes a lithium composite metal oxide of nickel (Ni)-cobalt (Co)-manganese (Mn) of the following Chemical Formula 2 and exhibits mono-modal-type particle distribution:

  [Chemical Formula 2]

In Chemical Formula 2, M includes any one, or two or more elements selected from the group consisting of Al, Zr, Mg, Zn, Y, Fe and Ti, and x, y and z are each $0<x<1$, $0\leq y<1$, $0<z<1$ and $0<x+y+z<1$, and a is $1.0 \leq a \leq 1.5$.

Yet another embodiment of the present disclosure provides a positive electrode for a secondary battery, a lithium secondary battery, a battery module and a battery pack including the positive electrode active material.

Other specifics of embodiments of the present disclosure are included in the detailed descriptions provided below.

Advantageous Effects

A precursor of a positive electrode active material for a secondary battery according to the present disclosure is capable of enhancing an initial capacity property, an output property and a long-term cycle life property of a battery by increasing lithium ion mobility and active material structural stability when preparing the positive electrode active material.

In addition, a positive electrode active material for a secondary battery prepared using the precursor is capable of reducing resistance, and enhancing output and cycle life properties when used in a battery since lithium intercalation and deintercalation readily occurs, and surface resistance and crack occurrences during charge and discharge are minimized.

DESCRIPTION OF DRAWINGS

The following drawings accompanied in the present specification illustrate preferred embodiments of the present disclosure, and further enlighten technological ideas of the present disclosure together with the disclosure of the invention described above, and therefore, the present disclosure is not to be interpreted to be limited to such descriptions provided in the drawings.

MODE FOR CARRYING OUT THE INVENTION

Figure 1:
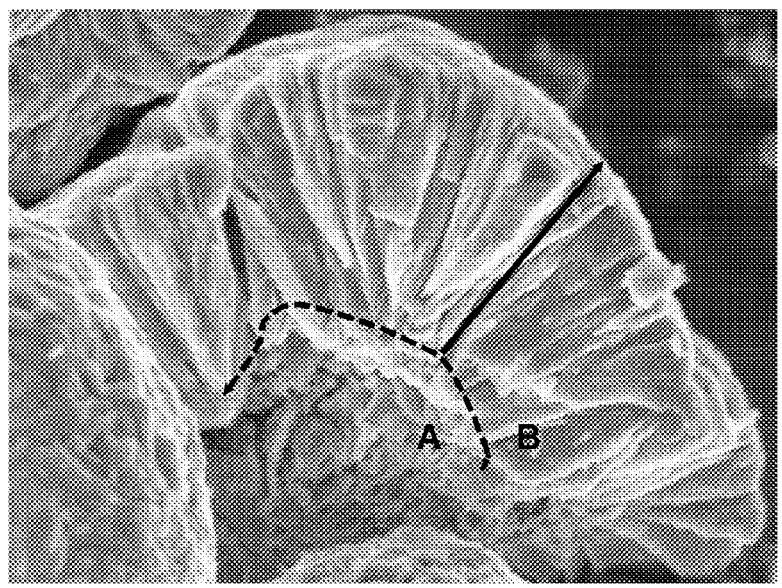
FIG. 1 is a photograph observing a precursor of a positive electrode active material prepared in Example 1 using a scanning electron microscope.

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Existing nickel-cobalt-manganese-based precursors are a continuous stirred tank reactor (CSTR)-type for improving productivity, and methods of production through a continuous reaction while using a less amount of ammonia, a chelating agent, have been normally used. However, active materials having mono-modal-type particle distribution are difficult to be produced using such a method, and most of prepared positive electrode active materials have rock-structured primary particles disorderedly arranged therein. A positive electrode active material having such a structure has high initial capacity, but has a problem in that resistance increases as cycles continue, which decreases output and cycle life stability.

In comparison, the present disclosure employs a high strength and high density shell structure exhibiting excellent structural stability instead of using an existing disorderedly arranged rock structure, and minimizes a surface area while allowing primary particles forming the shell to have fixed directivity, and as a result, is capable of enhancing lithium ion mobility and continuously maintaining such mobility.

In other words, a precursor of a positive electrode active material for a secondary battery according to one embodiment of the present disclosure includes a single layer-structured secondary particle in which pillar-shaped primary particles radially oriented in a surface direction from the particle center are aggregated, wherein the secondary particle has a shell shape, and the primary particle includes a composite metal hydroxide of nickel (Ni)-cobalt (Co)-manganese (Mn) of the following Chemical Formula 1:

  [Chemical Formula 1]

In Chemical Formula 1, M includes any one, or two or more elements selected from the group consisting of Al, Zr, Mg, Zn, Y, Fe and Ti, and x, y and z are each $0<x<1$, $0\leq y<1$, $0<z<1$ and $0<x+y+z<1$, and more specifically, $0<x+y+z<0.5$.

Herein, the composition of the composite metal hydroxide of Chemical Formula 1 is an average composition of the total precursor particles.

Specifically, the precursor according to one embodiment of the present disclosure is a secondary particle formed by the aggregation of primary particles, and the primary particles have a pillar shape and are radially oriented in a surface direction from the secondary particle center. By the pillar-shaped primary particles being arranged in a fixed direction as above, lithium intercalation and deintercalation, and lithium migration in the particles may readily occur.

Specifically, when a length of a major axis passing through the primary particle center is a length of the primary particle, the primary particle may have a length ratio of 0.3 to 1 with respect to a radius of the secondary particle, and more specifically, may have an average length of 2 μm to 8 μm.

In addition, when, in the primary particle, a ratio of a length of a major axis, which is perpendicular to a minor axis passing through the particle center, with respect to a length of the minor axis is an aspect ratio (=length of major axis/length of minor axis), the primary particle may have an average aspect ratio of 5 to 30, and more specifically may have an average aspect ratio of 10 to 12.

The primary particle may include the composite metal hydroxide of Ni—Co—Mn of Chemical Formula 1, and more specifically, a nickel-rich-type composite metal hydroxide including nickel in excess of 50 atomic % or higher with respect to the total content of the transition metal including Ni, Co and Mn. By including nickel in access as above, an effect of capacity increase may be obtained.

In addition, in the composite metal hydroxide, at least any one element of Ni, Co and Mn may be partially substituted or doped with any one, or two or more elements (M) selected from the group consisting of Al, Zr, Mg, Zn, Y, Fe and Ti. When substituted or doped as above, structural stability is enhanced when preparing a positive electrode active material, which exhibits a more superior cycle life property. The element (M) may include any one, or two or more elements selected from the group consisting of Al, Mg, Zr, Y, Fe and Ti, and may be included in an amount corresponding to y, that is, in the content of $0 \leq y < 1$ and more specifically $0 \leq y \leq 0.05$ within a range that does not decline properties of the positive electrode active material.

Meanwhile, the precursor according to one embodiment of the present disclosure is a secondary particle in which such primary particles are aggregated, and has a shell-shaped single layer structure.

By the pillar-shaped primary particles described above forming a single layer-structured shell with fixed orientation, lithium ion migration readily occurs due to a smaller number of primary particles compared to existing positive electrode active materials, resistance is minimized due to a small specific surface area, and degeneration and breakage phenomena occurring as cycles progress may be improved.

In addition, the secondary particulate precursor may exhibit mono-modal-type particle distribution during the preparation through controlling a preparation condition. Having a uniform particle size enables no concern over resistance increase even when cycles continue, and as a result, improved output property and cycle life stability may be exhibited.

The precursor may have an average particle diameter ($D_{50}$) of 7 μm to 20 μm, and a BET specific surface area of 5.0 m$^2$/g to 30.0 m$^2$/g.

When the precursor has an average particle diameter ($D_{50}$) of less than 7 μm, the size of the primary particle forming a shell is difficult to be in a ratio of 0.3 to 1.0 with respect to the size of the secondary particle, a final particle, and when the BET specific surface area is greater than 30.0 m$^2$/g, it is difficult to produce a pillar-structured primary particle-aggregated structure, and as a result, effects of improving positive electrode material properties may be insignificant. In addition, when the average particle diameter is greater than 20 μm or the BET specific surface area is less than 5.0 m$^2$/g, dispersity and capacity of the precursor itself may decrease. With its specific structure, the precursor according to one embodiment of the present disclosure may exhibit more superior capacity and charge and discharge properties by satisfying both average particle diameter and BET specific surface area conditions. More specifically, the precursor may have an average particle diameter ($D_{50}$) of 5 μm to 17 μm and a BET specific surface area of 7.0 m$^2$/g to 20.0 m$^2$/g.

In the present disclosure, the average particle diameter ($D_{50}$) of the precursor may be defined as a particle diameter based on 50% in the particle diameter distribution. In addition, in the present disclosure, the average particle diameter ($D_{50}$) of the precursor may be measured by observation with an electron microscope using a scanning electron microscope (SEM), a field emission scanning electron microscope (FE-SEM) or the like, or measured using a laser diffraction method. For example, when measured using a laser diffraction method, the precursor particles are dispersed into a dispersion medium and then introduced to a commercially available laser diffraction particle size measuring instrument (for example, Microtrac MT 3000), and after irradiating ultrasonic waves of approximately 28 kHz with an output of 60 W, the average particle diameter ($D_{50}$) based on 50% in the particle diameter distribution in the measuring instrument may be calculated.

In addition, in the present disclosure, the specific surface area of the precursor is measured using a BET method, and specifically, may be calculated from a nitrogen gas absorption amount under liquid nitrogen temperature (77 K) using BELSORP-mino II of BEL Japan.

The precursor having such a composition and physical properties may be prepared using a preparation method including preparing a metal-containing solution by mixing a nickel raw material, a cobalt raw material and a manganese raw material (step 1); and introducing an ammonium cation-containing complex forming agent and a basic compound to the metal-containing solution and co-precipitation reacting the result under a pH of 10.50 to 12.00 and a temperature of 50° C. to 70° C. (step 2). Herein, the ammonium cation-containing complex forming agent may be introduced at a rate of 0.5 times to 1.5 times with respect to an introduction rate of the metal-containing solution.

Hereinafter, each step will be described in detail. In the method for preparing a positive electrode active material, the step 1 is a step of preparing a precursor using a nickel raw material, a cobalt raw material and a manganese raw material. Herein, when the precursor further includes a metal element M (herein, M is any one, or two or more elements selected from the group consisting of Al, Zr, Mg, Zn, Y, Fe, and Ti), an M raw material may be added when mixing each of the metal element raw materials in the step 1.

Specifically, the precursor may be prepared by adding an ammonium cation-containing complex forming agent and a basic compound to a metal-containing solution prepared by mixing a nickel raw material, a cobalt raw material, a manganese raw material, and, selectively, an M raw material, and co-precipitation reacting the result. Herein, a mixing ratio of each of the raw materials may be properly determined within a range satisfying a content condition of each metal element in a finally prepared positive electrode active material.

The metal-containing solution may be prepared by adding each of a nickel raw material, a cobalt raw material, a manganese raw material, and, selectively, an M-containing raw material to a solvent, specifically, water or a mixture of water and an organic solvent uniformly mixable with water (specifically, alcohol and the like), or solutions, specifically, aqueous solutions, including each of the metal-containing raw materials are prepared, and then these are mixed to be used.

As the above-mentioned nickel, cobalt, manganese or M-containing raw material, acetates, nitrates, sulfates, halides, sulfides, hydroxides, oxides, oxyhydroxides or the like including these metals may be used, and these are not particularly limited as long as they are soluble in water.

As one example, the cobalt raw material may include $Co(OH)_2$, $CoOOH$, $Co(OCOCH_3)_2 \cdot 4H_2O$, $Co(NO_3)_2 \cdot 6H_2O$, $Co(SO_4)_2 \cdot 7H_2O$ or the like, and any one or a mixture of two or more thereof may be used.

As the nickel raw material, $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, fatty acid nickel salts, nickel halides or the like may be included, and any one or a mixture of two or more thereof may be used.

As the manganese raw material, manganese oxides such as $Mn_2O_3$, $MnO_2$ and $Mn_3O_4$; manganese salts such as $MnCO_3$, $Mn(NO_3)_2$, $MnSO_4$, manganese acetates, manganese dicarboxylates, manganese citrates and fatty acid manganese salts; manganese oxyhydroxides, manganese chloride and the like may be included, and any one or a mixture of two or more thereof may be used.

As the M raw material, acetates, nitrates, sulfates, halides, sulfides, hydroxides, oxides, oxyhydroxides or the like including the M element may be used. As one example, when the M is Al, $AlSO_4$, $AlCl$, $AlNO_3$ or a mixture of two or more thereof may be used, and when the M is W, tungsten oxide and the like may be used. The M raw material may be used in a range satisfying a content condition of the M element in a finally prepared positive electrode active material.

Next, the metal-containing solution prepared above, an ammonium cation-containing complex forming agent and a basic compound are introduced in a reactor and co-precipitation reacted.

Herein, the metal-containing solution is introduced for 7 hours to 20 hours at a rate of 100 ml/min to 300 ml/min based on a 250 L reactor so that the precursor particles grow at a rate of 0.1 μm/hr to 0.5 μm/hr, and the ammonium cation-containing complex forming agent may be introduced at a rate of 0.5 times to 1.5 times with respect to the introduction rate of the metal-containing solution. When introducing each of the materials at the above-mentioned introduction rate, precursor particle formation and growth rate are controlled, and a pillar-shaped primary particle, and a single layer-structured shell-shaped secondary particle formed from the aggregation of the primary particles may be formed.

Specific examples of the ammonium cation-containing complex forming agent may include $NH_4OH$, $(NH_4)_2SO_4$, $NH_4NO_3$, $NH_4Cl$, $CH_3COONH_4$, $NH_4CO_3$ or the like, and one type alone or a mixture of two or more types thereof may be used. In addition, the ammonium cation-containing complex forming agent may be used in an aqueous solution form, and herein, water or a mixture of water and an organic solvent uniformly mixable with water (specifically, alcohol and the like) may be used as the solvent.

Examples of the basic compound may include hydroxides of alkali metals or alkali earth metals such as NaOH, KOH or $Ca(OH)_2$, or hydrates thereof, and any one, or a mixture of two or more thereof may be used. The basic compound may also be used in an aqueous solution form, and herein, water or a mixture of water and an organic solvent uniformly mixable with water (specifically, alcohol and the like) may be used as the solvent.

In the co-precipitation reaction, the pH may be maintained at from pH 10.50 to pH 12.00 and more specifically from pH 10.50 to pH 11.50 from immediately after the raw material introduction to 30 minutes from the beginning of the reaction, and maintained at from pH 11.00 to pH 11.50 and more specifically from pH 11.00 to pH 11.30 during the co-precipitation reaction thereafter carried out with continuous raw material introduction. By controlling a PH during the co-precipitation reaction, a pillar-shaped primary particle, and a single layer-structured shell-shaped secondary particle formed from the aggregation of the primary particles may be formed. When the pH condition is outside the above-mentioned range, changes in the precursor form and particle splitting may occur, and elution of metal ions may occur on the precursor surface causing a concern of forming various oxides due to a side reaction. Herein, the pH value means a pH value at a liquid temperature of 25° C. In addition, particle sphericity and a pillar-shaped shell structure forming the particle may change depending on the introduction rate of the metal-containing solution during the co-precipitation reaction. This may be difficult to differentiate in a shell section structure in the precursor state, but may be differentiated in a shell section structure of a positive electrode material after baking. Accordingly, more accurately, a shell section structure of the positive electrode material may enhance properties of the positive electrode material close to a pillar structure compared to a shell section structure of the precursor.

Accordingly, the ammonium cation-containing complex forming agent and the basic compound may be properly introduced so as to satisfy the pH condition during the co-precipitation reaction, and specifically, the ammonium cation-containing complex forming agent and the basic compound may be introduced in a molar ratio of 1:10 to 1:2.

More specifically, the ammonium cation-containing complex forming agent may be added in an amount to have a molar ratio of 0.5 to 1 with respect to 1 mol of the metal-containing solution. A chelating agent generally reacts with a metal in a molar ratio of 1:1 or higher to form a complex, however, the amount of the chelating agent used in the present disclosure may be reduced compared to general cases since, of the formed complexes, unreacted complexes that do not react with the basic aqueous solution change to an intermediate and are collected as a chelating agent to be reused. As a result, a positive electrode active material may have high crystallinity and be stabilized.

The co-precipitation reaction may be carried out at a temperature of 50° C. to 70° C. and more specifically 60° C. to 70° C. under inert atmosphere such as nitrogen. In addition, a stirring process may be selectively carried out for increasing a reaction rate during the reaction.

As a result of such processes, a composite metal hydroxide particles having the above-mentioned structure are produced and precipitated in the reaction solution as the precursor. Specifically, the precursor may include the compound of Chemical Formula 1, and may have a pillar shape. Inducing the precursor shape to a pillar shape as above may be accomplished by both controlling raw material concentrations, a temperature and a pH during the reaction, and an introduction rate of the ammonium cation-containing complex forming agent, and pillar sizes and directivity may be controlled through selecting a pH region capable of inducing composite metal oxide particle growth and controlling the introduction rate. Even more specifically, the co-precipitation reaction may be carried out under a condition of introducing the ammonium cation-containing complex forming agent in a rate of 0.5 times to 1.5 times and more specifically 1.0 times to 1.5 times with respect to the introduction rate of the metal-containing solution under a pH of 11.00 to 12.00 and a temperature of 60° C. to 70° C.

In addition, for the precipitated precursor, a drying process may be selectively carried out after separating with common methods.

The drying process may be carried out using common drying methods, and specifically, may be carried out for 15 hours to 30 hours using a method such as heating treatment and hot air injection in a temperature range of 100° C. to 200° C.

Meanwhile, another embodiment of the present disclosure provides a positive electrode active material prepared using the precursor.

Specifically, the positive electrode active material is prepared by mixing the precursor with a lithium raw material and heat treating the result, and has physical properties similar to the precursor except that particle sizes of the precursor decrease due to the heat treatment. Herein, when the positive electrode active material further includes an M element, a M-containing raw material may be selectively further added when mixing with the lithium raw material, and the M-containing raw material is the same as described above.

Examples of the lithium raw material may include lithium-containing carbonates (for example, lithium carbonate and the like), hydrates (for example, lithium hydroxide monohydrate ($LiOH \cdot H_2O$) and the like), hydroxides (for example, lithium hydroxide and the like), nitrates (for example, lithium nitrate ($LiNO_3$) and the like), chlorides (for example, lithium chloride (LiCl) and the like) and the like, and one type alone or a mixture of two or more types thereof may be used. The amount of the lithium-containing raw material used may be determined by the content of lithium and metal elements (Me) other than the lithium in a finally prepared lithium composite metal oxide, and specifically, lithium included in the lithium raw material and metal elements (Me) included in the composite metal hydroxide may be used in amounts to have a molar ratio (molar ratio of lithium/metal elements (Me)) of 1.0 or greater and more specifically from 1.0 to 1.5.

The heat treatment process may be carried out at 700° C. to 950° C., 750° C. to 900° C., or 750° C. to 870° C.

By controlling a temperature during the heat treatment process, shapes, sizes, aspect ratios and orientation of the primary particles may be controlled, and by carrying out the process in the above-mentioned temperature range, a positive electrode active material having the structure described above may be prepared. In addition, the heat treatment process may be carried out in multi-steps of 2 to 3 steps.

The heat treatment process may be carried out under air atmosphere or oxygen atmosphere (for example, $O_2$ and the like), and more specifically, may be carried out under oxygen atmosphere of oxygen partial pressure of 20% by volume or higher. In addition, the heat treatment process may be carried out for 5 hours to 48 hours, or 10 hours to 20 hours under the above-mentioned condition.

In addition, a sintering aid may be selectively further added during the heat treatment process so as to readily grow crystals at low temperatures, and to minimize a non-uniform reaction during the dry mixing.

Specific examples of the sintering aid may include boron compounds such as boric acid, lithium tetraborate, boric oxide and ammonium borate, and may be used in an amount of 0.2 parts by weight to 2 parts by weight and more specifically 0.4 parts by weight to 1.4 parts by weight with respect to the total weight of the precursor.

As described above, the positive electrode active material prepared using the precursor according to the present disclosure includes a single layer-structured secondary particle in which pillar-shaped primary particles radially oriented in a surface direction from the particle center are aggregated, wherein the secondary particle has a shell shape, and the primary particle includes a lithium composite metal oxide of nickel (Ni)-cobalt (Co)-manganese (Mn) of the following Chemical Formula 2 and exhibits mono-modal-type particle distribution:

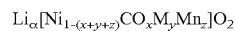  [Chemical Formula 1]

In Chemical Formula 2, M, x, y and z have the same definitions as above, and a is $1.0 \leq a \leq 1.5$.

Herein, the composition of the lithium composite metal oxide of Chemical Formula 2 is an average composition of the total active material particles.

In the lithium composite metal oxide of Chemical Formula 2, Li may be included in the content corresponding to a, that is, $1.0 \leq a \leq 1.5$. When a is less than 1.0, a concern of capacity decrease may occur, and when a is greater than 1.5, the particles are sintered in a baking process making active material preparation difficult. When considering a balance between significance of a capacity property improving effect of the positive electrode active material obtained from controlling the Li content and sintering during the active material preparation, the Li may be more specifically included in the content of $1.0 \leq a \leq 1.15$.

In the positive electrode active material, the primary particle may have a length ratio of 0.3 to 1 with respect to a radius length of the secondary particle. More specifically, in the positive electrode active material, an average length of the primary particle may be from 2 μm to 8 μm. Herein, the average length of the primary particle means an average length of a major axis passing through the primary particle center.

In addition, in the positive electrode active material, when a ratio of a length of a major axis, which is perpendicular to a minor axis passing through the primary particle center, with respect to a length of the minor axis is an aspect ratio, the primary particle may have an average aspect ratio of 5 to 30, and more specifically may have an average aspect ratio of 10 to 12.

The positive electrode active material according to one embodiment of the present disclosure may have an average particle diameter ($D_{50}$) of 7 μm to 15 μm and a BET specific surface area of 0.1 $m^2/g$ to 1.0 $m^2/g$.

The positive electrode active material having an average particle diameter of less than 7 μm or a BET specific surface area of greater than 1.0 $m^2/g$ may cause a concern of resistance increase in the electrode, and the positive electrode active material having an average particle diameter of greater than 15 μm or a BET specific surface area of less than 0.1 $m^2/g$ may cause a concern over dispersibility decrease and capacity decrease in the positive electrode active material itself. With its specific structure, the positive electrode active material according to one embodiment of the present disclosure may exhibit more superior capacity and charge and discharge properties by satisfying both average particle diameter and BET specific surface area conditions. More specifically, the positive electrode active material may have an average particle diameter ($D_{50}$) of 7 μm to 12 μm and a BET specific surface area of 0.1 $m^2/g$ to 0.3 $m^2/g$.

In addition, the positive electrode active material according to one embodiment of the present disclosure may have tap density of 1.7 g/cc or greater, or 1.7 g/cc to 3.0 g/cc, and more specifically may have tap density of 2.5 g/cc to 3.0 g/cc. By having high tap density in the above-mentioned range, a high-capacity property may be exhibited.

In the present disclosure, tap density of the positive electrode active material may be measured using common tap density measuring instruments, and specifically, may be measured using Tap-2S manufactured by Logan Corporation.

By minimizing a surface area while the primary particles that form a shell having fixed directivity, the positive electrode active material according to one embodiment of the present disclosure is capable of enhancing an initial capacity property, an output property and a long-term cycle life property when used in a battery by increasing lithium ion mobility and active material structural stability.

Accordingly, still another example of the present disclosure provides a positive electrode and a lithium secondary battery including the positive electrode active material.

Specifically, the positive electrode includes a positive electrode current collector and a positive electrode active material layer formed on the positive electrode current collector and including the positive electrode active material.

The positive electrode current collector is not particularly limited as long as it has conductivity without inducing chemical changes in the battery, and examples thereof may include stainless steel, aluminum, nickel, titanium, baked carbon, or aluminum or stainless steel of which surface is treated with carbon, nickel, titanium, silver or the like. In addition, the positive electrode current collector may commonly have a thickness of 3 µm to 500 µm, and adhesive strength of the positive electrode active material may be enhanced by forming fine unevenness on the surface of the current collector. For example, various forms such as films, sheets, foil, nets, porous bodies, foams and non-woven fabrics may be used.

The positive electrode active material layer may include a conductor and a binder together with the positive electrode active material described above.

Herein, the conductor is used for providing conductivity to the electrode, and, in the formed battery, is not particularly limited as long as it has electron conductivity without inducing chemical changes. Specific examples thereof may include graphite such as natural graphite or artificial graphite; carbon-based materials such as carbon black, acetylene black, Ketjen black, channel black, furnace black, lamp black, thermal black and carbon fiber; metal powder such as copper, nickel, aluminum and silver, or metal fiber; conductive whiskers such as zinc oxide and potassium titanate; conductive metal oxides such as titanium oxide; conductive polymers such as polyphenylene derivatives, or the like, and these may be used either alone as one type or as a mixture of two or more types thereof. The conductor may be normally included in 1% by weight to 30% by weight with respect to the total weight of the positive electrode active material layer.

In addition, the binder performs a role of enhancing adhesion between the positive electrode active material particles and adhesive strength between the positive electrode active material and the current collector. Specific examples thereof may include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof. These may be used either alone as one type or as a mixture of two or more types thereof. The binder may be included in 1% by weight to 30% by weight with respect to the total weight of the positive electrode active material layer.

The positive electrode may be prepared using common positive electrode preparation methods except that the positive electrode active material is used. Specifically, the positive electrode may be prepared by coating a composition for forming a positive electrode active material layer including the positive electrode active material and, selectively, the binder and the conductor on the positive electrode current collector, and then drying and rolling the result. Herein, types and content of the positive electrode active material, the binder and the conductor are as described above.

As the solvent, solvents generally used in the art may be used, and examples thereof may include dimethyl sulfoxide (DMSO), isopropyl alcohol, N-methyl-pyrrolidone (NMP), acetone, water or the like, and one type, or a mixture of two or more types thereof may be used. The amount of the solvent used is sufficient when the amount is capable of dissolving or dispersing the positive electrode active material, the conductor and the binder considering slurry coating thickness and preparation yield, and the slurry has viscosity to exhibit excellent thickness uniformity when coated for preparing the positive electrode thereafter.

As another method, the positive electrode may be prepared by casting the composition for forming a positive electrode active material layer on a separate support, and then laminating a film obtained by peel-off from this support on the positive electrode current collector.

Yet another embodiment of the present disclosure provides an electrochemical device including the positive electrode. The electrochemical device may specifically be a battery, a capacitor and the like, and more specifically, a lithium secondary battery.

The lithium secondary battery specifically includes a positive electrode, a negative electrode placed opposite to the positive electrode, a separator provided between the positive electrode and the negative electrode, and an electrolyte, wherein the positive electrode is the same as described above. In addition, the lithium secondary battery may selectively include a battery container storing an electrode assembly of the positive electrode, the negative electrode and the separator, and an encapsulating member encapsulating the battery container.

In the lithium secondary battery, the negative electrode includes a negative electrode current collector and a negative electrode active material layer placed on the negative electrode current collector.

The negative electrode current collector is not particularly limited as long as it has high conductivity without inducing chemical changes in the battery, and examples thereof may include copper, stainless steel, aluminum, nickel, titanium, baked carbon, copper or stainless steel of which surface is treated with carbon, nickel, titanium, silver or the like, aluminum-cadmium alloys, and the like. In addition, the negative electrode current collector may commonly have a thickness of 3 µm to 500 µm, and, like the positive electrode current collector, may strengthen adhesive strength of the negative electrode active material by forming fine unevenness on the surface of the current collector. For example, various forms such as films, sheets, foil, nets, porous bodies, foams and non-woven fabrics may be used.

The negative electrode active material layer selectively includes a binder and a conductor together with the negative electrode active material. As one example, the negative electrode active material layer may be prepared by coating a composition for forming a negative electrode including the negative electrode active material, and selectively, the binder and the conductor on the negative electrode current collector and then drying the result, or casting the composition for forming a negative electrode on a separate support, and then laminating a film obtained by peel-off from this support on the negative electrode current collector.

As the negative electrode active material, compounds capable of reversible lithium intercalation and deintercalation may be used. Specific examples thereof may include carbon materials such as artificial graphite, natural graphite, graphitized carbon fiber and amorphous carbon; metal compounds capable of alloying with lithium such as Si, Al, Sn, Pb, Zn, Bi, In, Mg, Ga, Cd, Si alloys, Sn alloys or Al alloys; metal oxides capable of doping and dedoping lithium such as $SiO_x$ ($0<x<2$), $SnO_2$, vanadium oxides and lithium vanadium oxides; composites including the metal compound and the carbon material such as a Si—C composite or a Sn—C composite, or the like, and any one or a mixture of two or more thereof may be used. In addition, a metal lithium thin film may be used as the negative electrode active material. As the carbon material, both low crystalline carbon and high crystalline carbon may be used. Low crystalline carbon typically includes soft carbon and hard carbon, and high crystalline carbon typically includes amorphous, plate, scaly, spherical or fiber-type natural graphite or artificial graphite, Kish graphite, pyrolytic carbon, mesophase pitch based carbon fiber, meso-carbon microbeads, mesophase pitches and high-temperature baked carbon such as petroleum or coal tar pitch derived cokes.

In addition, the binder and the conductor may be same as those previously described in the positive electrode.

Meanwhile, in the lithium secondary battery, the separator separates the negative electrode and the positive electrode and provides a lithium ion migration path, and is not particularly limited as long as it is used as a separator in common lithium secondary batteries, and particularly, separators having an excellent liquid electrolyte moisture permeating ability while having low resistance for electrolyte ion migration are preferred. Specifically, porous polymer films, for example, porous polymer films prepared with polyolefin-based polymers such as ethylene homopolymers, propylene homopolymers, ethylene/butene copolymers, ethylene/hexene copolymers and ethylene/methacrylate copolymers, or laminated structures of two or more layers thereof, may be used. In addition, common porous non-woven fabrics, for example, non-woven fabrics made of high melting point glass fiber, polyethylene terephthalate fiber or the like may be used. In addition, coated separators including ceramic components or polymer materials may also be used for securing heat resistance or mechanical strength, and selectively, the separator may be used in a single layer or multilayer structure.

As the electrolyte used in the present disclosure, organic-based liquid electrolytes, inorganic-based liquid electrolytes, solid polymer electrolytes, gel-type polymer electrolytes, solid inorganic electrolytes, molten-type inorganic electrolytes and the like capable of being used in the manufacture of lithium secondary batteries may be used, however, the electrolyte is not limited thereto.

Specifically, the electrolyte may include an organic solvent and a lithium salt.

The organic solvent may be used without particular limit as long as it is capable of performing a role of a medium in which ions participating in a battery electrochemical reaction are capable of migrating. Specific examples of the organic solvent may include ester-based solvents such as methyl acetate, ethyl acetate, γ-butyrolactone or ε-caprolactone; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methylethyl carbonate (MEC), ethylmethyl carbonate (EMC), ethylene carbonate (EC) or propylene carbonate (PC); alcohol-based solvents such as ethyl alcohol and isopropyl alcohol; nitriles such as R—CN (R is a C2 to C20 linear, branched or cyclic hydrocarbon group, and may include double bond aromatic rings or ether bonds); amides such as dimethylformamide; dioxolanes such as 1,3-dioxolane; sulfolanes, or the like. Among these, carbonate-based solvents are preferred, and more specifically, mixtures of cyclic carbonate (for example, ethylene carbonate, propylene carbonate or the like) having high ionic conductivity and a high dielectric constant capable of enhancing charge and discharge performance of a battery, and linear carbonate-based compounds with low viscosity (for example, ethylmethyl carbonate, dimethyl carbonate, diethyl carbonate or the like) are more preferred. In this case, mixing and using the cyclic carbonate and the chain carbonate in a volume ratio of 1:1 to 1:9 may exhibit excellent liquid electrolyte performance.

The lithium salt may be used without particular limit as long as it is a compound capable of providing lithium ions used in lithium secondary batteries. Specific examples of the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$ or the like. The lithium salt is favorably used in a concentration range of 0.1 M to 2.0 M. When the lithium salt concentration is in the above-mentioned range, the electrolyte has proper conductivity and viscosity, and therefore, may exhibit excellent electrolyte performance, and lithium ions may effectively migrate.

In addition to the electrolyte-forming components, the electrolyte may further include one or more types of additives such as haloalkylene carbonate-based compounds such as difluoroethylene carbonate, pyridine, triethylphosphite, triethanolamine, cyclic ether, ethylenediamine, n-glyme, hexaphosphoric triamide, nitrobenzene derivatives, sulfur, quinone-imine dyes, N-substituted oxazolidinone, N,N-substituted imidazolidine, ethylene glycol dialkyl ether, ammonium salts, pyrrole, 2-methoxyethanol or aluminum trichloride for the purpose of enhancing a battery cycle life property, suppressing a battery capacity decrease, enhancing battery discharge capacity, and the like. Herein, the additive may be included in 0.1% by weight to 5% by weight with respect to the total weight of the electrolyte.

The lithium secondary battery including the positive electrode active material according to the present disclosure as above stably exhibits excellent discharge capacity, output property and capacity retention rate, and therefore, is useful in the fields of portable devices such as mobile phones, notebook computers and digital cameras, electric vehicles such as hybrid electric vehicles (HEV), and the like.

Accordingly, yet still another embodiment of the present disclosure provides a battery module including the lithium secondary battery as a unit cell, and a battery pack including the same.

The battery module or the battery pack may be used as a power supply of any one or more of medium to large sized devices selected from among power tools; electric vehicles including electric vehicles (EV), hybrid electric vehicles (HEV) and plug-in hybrid electric vehicles (PHEV); or systems for power storage.

Hereinafter, examples of the present disclosure will be described in detail so that those skilled in the art readily carry out the present disclosure. However, the present disclosure may be implemented into many different forms, and is not limited to the examples described herein.

Example 1

30% by volume of ultrapure water in with respect to the reactor volume was introduced to a 250 L co-precipitation reactor, and nitrogen was injected for maintaining nitrogen atmosphere during the reaction. Herein, the temperature was maintained at 50° C. to 55° C. while introducing a raw material, and after completing the raw material introduction, the temperature was raised to a temperature of approximately 60° C. to 70° C. to carry out a co-precipitation reaction. In addition, when the temperature in the reactor reached a certain reaction temperature, initial ammonia was introduced in approximately 5% with respect to the ultrapure water, and a NaOH solution was introduced thereto to make the initial pH to approximately 12.00. In addition, a metal solution dissolving nickel sulfate, cobalt sulfate and manganese sulfate so that a molar ratio of nickel:cobalt:manganese became 60:20:20 was used as the raw material, a rate of the metal solution introduction was employed as approximately 250 ml/min, and the ammonia, a chelating agent, was introduced at a rate of approximately 1.1 times with respect to the rate of the metal solution introduction. The reaction pH was maintained at approximately from pH 10.50 to pH 11.00 from the initial reaction to 30 minutes from the beginning of the reaction, and after that, the reaction pH was maintained at 11.00 to 11.30 while the raw material introduction continued. The raw material was introduced over approximately 8 hours, and a stirring rate in the reactor was maintained at 300 rpm. In addition, after a reaction time of forming an A section of a precursor fracture surface in FIG. 1, a rate of particle growth in a B section, a shell part of a secondary particle, was controlled to 0.4 μm per hour through controlling the introduction rate of the metal solution. Particle diameters of an obtained precursor were approximately from 11.5 μm to 12 μm, and an average particle diameter ($D_{50}$) thereof was 11.8 μm.

The obtained precursor was washed using caustic soda in a filter press, dried for a day in an oven with a temperature of approximately 130° C., mixed with lithium carbonate ($Li_2CO_3$) in a molar ratio of 1:1.03, and heat treated for 8 hours at 870° C. under air atmosphere to prepare a positive electrode active material. After the heat treatment, particle diameters of the active material were approximately from 11 μm to 11.5 μm, and an average particle diameter ($D_{50}$) thereof was 11.2 μm.

Comparative Example 1

A precursor and a lithium metal oxide positive electrode active material were prepared in the same manner as in Example 1, except that the reaction temperature was from 50° C. to 55° C., the reaction pH was from 10.80 to 11.00, and the rate of the ammonia introduction was approximately 0.3 times with respect to the introduction rate of the metal solution.

Preparation Example 1

Manufacture of Lithium Secondary Battery

A lithium secondary battery was manufactured using the positive electrode active material prepared in Example 1.

In detail, the positive electrode active material prepared in Example 1, a carbon black conductor and a PVdF binder were mixed in a weight ratio of 92.5:3.5:4, respectively, in an N-methyl pyrrolidone solvent to prepare a composition for forming a positive electrode (viscosity: 5000 mPa·s), the result was coated on an aluminum current collector, dried at 130° C. and then rolled to prepare a positive electrode.

In addition, as a negative electrode active material, natural graphite, a carbon black conductor and a PVdF binder were mixed in a weight ratio of 85:10:5, respectively, in an N-methyl pyrrolidone solvent to prepare a composition for forming a negative electrode, and the result was coated on a copper current collector to prepare a negative electrode.

A porous polyethylene separator was provided between the positive electrode and the negative electrode prepared as above to prepare an electrode assembly, and the electrode assembly was placed inside a case, and a liquid electrolyte was injected to the inside of the case to prepare a lithium secondary battery. Herein, the liquid electrolyte was prepared by dissolving lithium hexafluorophosphate ($LiPF_6$) having a concentration of 1.0 M in an organic solvent formed with ethylene carbonate/dimethyl carbonate/ethylmethyl carbonate (mixed volume ratio of EC/DMC/EMC=3/4/3).

Test Example 1

Observation on Precursor and Positive Electrode Active Material

The positive electrode active materials prepared in Example 1 and Comparative Example 1 were each observed using a scanning electron microscope. The results are shown in FIGS. 1 to 3.

Figure 2A:
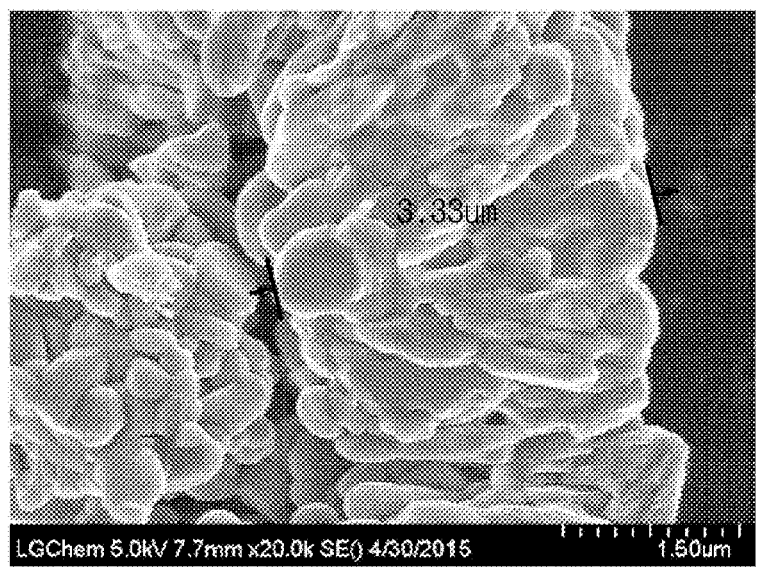
FIG. 2a and FIG. 2b are photographs observing a positive electrode active material prepared in Example 1 from various locations using a scanning electron microscope.
Figure 2B:
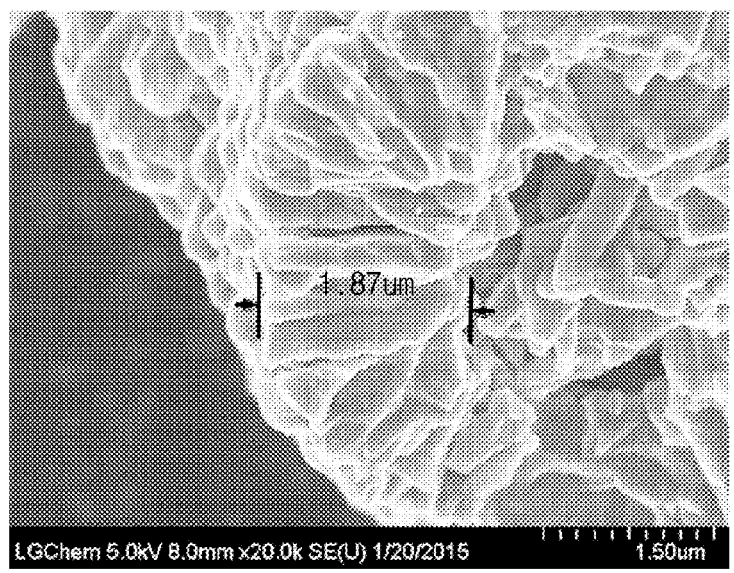
Figure 3:
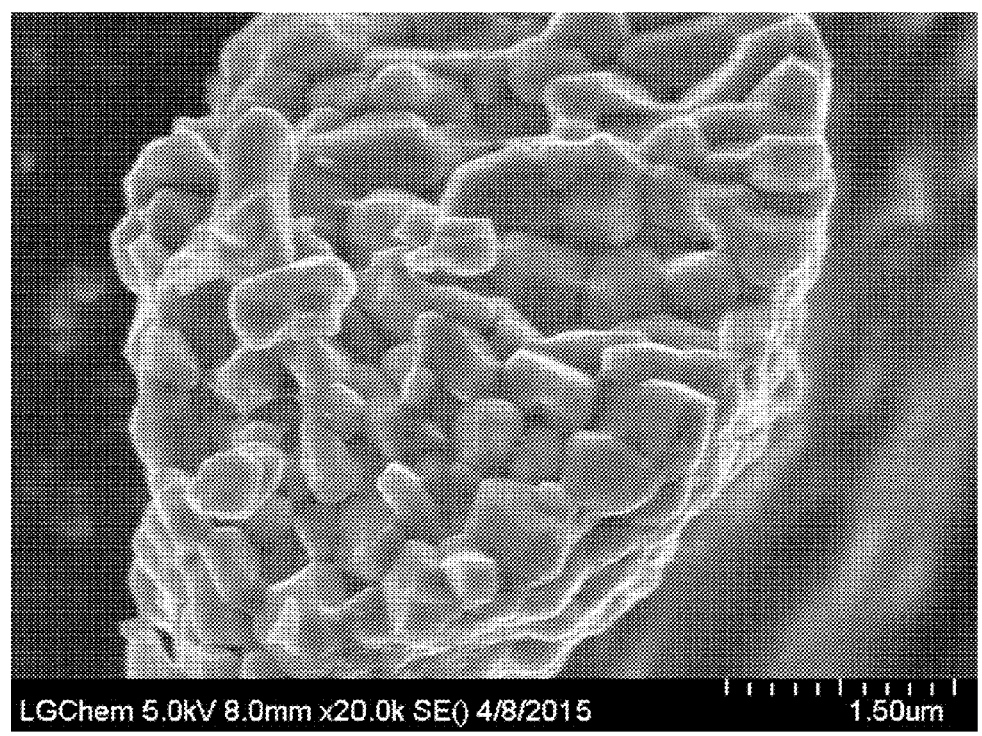
FIG. 3 is a photograph observing a positive electrode active material prepared in Comparative Example 1 using a scanning electron microscope.

FIG. 1 is a photograph observing the precursor of the positive electrode active material prepared in Example 1 using a scanning electron microscope, and FIG. 2a and FIG. 2b are photographs observing the positive electrode active material prepared in Example 1 from various locations using a scanning electron microscope. FIG. 3 is a photograph observing the positive electrode active material prepared in Comparative Example 1 using a scanning electron microscope.

Based on the observation, it was identified that, while primary particles in a rock structure were disorderedly arranged in Comparative Example 1, pillar-shaped primary particles having a uniform single phase radially grew in a surface direction from the particle center to form a single-layer structured secondary particle having a shell shape in Example 1.

Test Example 2

Analysis on Precursor and Positive Electrode Active Material

An average particle diameter, particle distribution, a specific surface area and tap density were measured on the precursor and the positive electrode active material prepared in Example 1, and the results are shown in the following Table 1.

(1) Average particle diameter ($D_{50}$) and particle distribution: after introduced to a laser diffraction particle size measuring instrument (for example, Microtrac MT 3000), and irradiating ultrasonic waves of approximately 28 kHz with an output of 60 W, particle distribution and an average particle diameter ($D_{50}$) based on 50% in the particle diameter distribution in the measuring instrument were obtained.

(2) BET specific surface area ($m^2/g$): calculated from a nitrogen gas absorption amount under a liquid nitrogen temperature (77 K) using BELSORP-mino II manufactured by BEL Japan.

(3) Tap density (g/cc): measured using a tap density tester (Tap-2S manufactured by Logan Corporation).

TABLE 1

|  |  | Example 1 | Comparative Example 1 |
|---|---|---|---|
| Precursor | Average Particle Diameter (μm) of Primary Particles | 3.3 | 3.2 |
|  | Average Aspect Ratio of Primary Particles | 11 | 2 |
|  | Particle Distribution of Secondary Particles | Mono-modal Type | Mono-modal Type |
|  | Average Particle Diameter ($D_{50}$) (μm) of Secondary Particles | 11.50 | 11.50 |
|  | BET Specific Surface Area ($m^2/g$) | 12.7 | 19.8 |
| Positive Electrode Active Material | Average Particle Diameter ($D_{50}$) (μm) of Primary Particles | 3.27 | 3.1 |
|  | Particle Distribution of Primary Particles | Mono-modal Type | Mono-modal Type |
|  | Average Particle Diameter ($D_{50}$) (μm) of Secondary Particles | 11.05 | 10.92 |
|  | BET Specific Surface Area ($m^2/g$) | 0.21 | 0.32 |
|  | Tap Density (g/cc) | 2.62 | 2.34 |

Test Example 3

Evaluation on Positive Electrode Active Material

A coin cell (using negative electrode of Li metal) prepared using the positive electrode active material prepared in Example 1 was charged to 4.25 V under a constant current (CC) of 0.1 C at 25° C., and then charged under a constant voltage (CV) of 4.25 V to carry out first charge until a charge current became 0.05 mAh. After that, the coin cell was left unattended for 20 minutes, and discharged to 3.0 V under a constant current of 0.1 C to measure discharge capacity at the first cycle. After that, charge/discharge capacity, charge and discharge efficiency and rate capability were each evaluated while varying the discharge condition to 2 C. The results are shown in the following Table 2.

TABLE 2

|  | First Charge and Discharge | | | 2 C Rate 2.0 C/ 0.1 C (%) | Cycle Life Property Capacity Retention Rate (%) after 50 Cycles |
|---|---|---|---|---|---|
|  | Charge Capacity (mAh/g) | Discharge Capacity (mAh/g) | Charge and Discharge Efficiency (%) |  |  |
| Example 1 | 192.5 | 172.7 | 89.7 | 88.1 | 99.39 |
| Comparative Example 1 | 191.3 | 170.3 | 89.0 | 87.1 | 97.48 |

Based on the test results, it was identified that, the battery including the positive electrode active material of Example 1 exhibited more superior capacity property and charge and discharge efficiency and also had an improved effect in terms of rate capability compared to the battery including the positive electrode active material of Comparative Example 1.

What is claimed is:

1. A precursor of a positive electrode active material for a secondary battery, comprising:
a secondary particle having a single layer structure, wherein the single layer structure is an aggregate of pillar-shaped primary particles radially oriented in a surface direction from the particle center of the secondary particle,
wherein
the primary particle includes a composite metal hydroxide of Ni—Co—Mn of the following Chemical Formula 1:

$$Ni_{1-(x+y+z)}Co_xM_yMn_z(OH)_2 \quad \text{[Chemical Formula 1]}$$

wherein, in Chemical Formula 1,
M includes any one, or two or more elements selected from the group consisting of Al, Zr, Mg, Zn, Y, Fe and Ti; and
x, y and z are each $0<x<1$, $0\leq y<1$, $0<z<1$ and $0<x+y+z<1$,
wherein the precursor is prepared by a method comprising:
introducing an ammonium cation-containing complex forming agent and a basic compound to a metal-containing solution to form a reaction solution, wherein a metal-containing solution includes a nickel raw material, a cobalt raw material and a manganese raw material; and
co-precipitation reacting the reaction solution under a pH of 10.50 to 12.00 and a temperature of 50° C. to 70° C., wherein the ammonium cation-containing complex forming agent is introduced at a rate of 0.5 times to 1.5 times with respect to an introduction rate of the metal-containing solution.

2. The precursor of a positive electrode active material for a secondary battery of claim 1, wherein $0<x+y+z<0.5$ in Chemical Formula 1.

3. The precursor of a positive electrode active material for a secondary battery of claim 1, wherein the primary particle has a length ratio of 0.3 to 1 with respect to a radius of the secondary particle when considering a length of a major axis passing through the particle center as a length of the primary particle.

4. The precursor of a positive electrode active material for a secondary battery of claim 1, wherein the primary particle has an average aspect ratio of 5 to 30 when considering a ratio of a length of a major axis, which is perpendicular to a minor axis passing through the particle center, with respect to a length of the minor axis as an aspect ratio.

5. The precursor of a positive electrode active material for a secondary battery of claim 1, wherein the precursor has an average particle diameter ($D_{50}$) of 7 μm to 20 μm and a BET specific surface area of 5.0 $m^2/g$ to 30.0 $m^2/g$.

6. The method for preparing the precursor of a positive electrode active material for a secondary battery of claim 1, wherein the ammonium cation-containing complex forming agent and the basic compound are used in a molar ratio of 1:10 to 1:2.

7. A positive electrode active material for a secondary battery, comprising:
a secondary particle having a single layer structure,
wherein the single layer structure is an aggregate of pillar-shaped primary particles radially oriented in a surface direction from the particle center of the secondary particle,
wherein
the primary particle includes a lithium composite metal oxide of Ni—Co—Mn of the following Chemical Formula 2 and exhibits mono-modal-type particle distribution:

$$Li_\alpha[Ni_{1-(x+y+z)}Co_xM_yMn_z]O_2 \quad \text{[Chemical Formula 2]}$$

wherein, in Chemical Formula 2,

M includes any one, or two or more elements selected from the group consisting of Al, Zr, Mg, Zn, Y, Fe and Ti;

x, y and z are each $0<x<1$, $0\leq y<1$, $0<z<1$ and $0<x+y+z<1$; and a is $1.0\leq a\leq 1.5$.

8. The positive electrode active material for a secondary battery of claim 7, wherein the positive electrode active material has an average particle diameter of 7 μm to 15 μm and a BET specific surface area of 0.1 $m^2$/g to 1.0 $m^2$/g.

9. The positive electrode active material for a secondary battery of claim 7, which has tap density of 1.7 g/cc to 3.0 g/cc.

10. A positive electrode for a secondary battery comprising the positive electrode active material of claim 7.

11. A lithium secondary battery comprising the positive electrode of claim 10.

* * * * *